: 3,168,507
Patented Feb. 2, 1965

3,168,507
PROCESS FOR POLYMERIZATION OF BUTADIENE IN AQUEOUS MEDIA
Thomas M. Shryne, Walnut Creek, Calif., assignor to Shell Oil Company, New York, N.Y., a corporation of Delaware
No Drawing. Filed Aug. 6, 1962, Ser. No. 214,813
6 Claims. (Cl. 260—94.3)

This invention relates to the polymerization of butadiene. More particularly, it relates to the stereospecific polymerization of butadiene at accelerated rates.

Certain conjugated dienes and other vinyl monomers may be polymerized to produce stereospecific products. Such polymerizations can be conducted in contact with catalysts that are referred to in the art as "Ziegler" or "low-pressure" catalysts. Other catalysts being used to produce stereospecific polymers are the lithium-based catalysts. Representative of these Ziegler catalysts are the reaction products of a transition metal halide and an organo metallic compound, such as an aluminum alkyl halide. The lithium based catalysts are represented, for example, by lithium butyl or a mixture of lithium butyl and lithium metal.

These catalysts are always employed in the presence of inert hydrocarbon solvent and in the veritable absence of water, oxygen, and other polar contaminants. The prior art technique, while being highly suitable for the production of useful products, has several disadvantages which are mainly attributable to the requirement that the hydrocarbon solvent be employed as the medium in the substantial absence of water. These disadvantages are normally concerned with the concentration limitation imposed on the system. For example, the presence of more than only a few percent of polymer in the hydrocarbon solution produces a cement which is so high in viscosity as to be substantially impractical for further commercial treatment. Secondly, the use of solvent systems requires that the solvent be completely removed. While it is possible to remove the large bulk of the solvents without difficulty, it is extremely difficult in practice to remove the remainder, thus causing later difficulty in utilization and quality of the resulting product or requiring intricate and expensive processing steps for the ultimate removal.

The avoidance of solvent polymerization systems has been found possible by the use of aqueous systems containing certain water-soluble catalysts which are preferably certain transition metal compounds. While the high degree of control over stereospecificity of the system is possible by such means, when utilizing the proper selection of metallic salt, the rate and extent of polymerization has been far from satisfactory. The systems heretofore employed showed either extremely low rates of polymerization or a relatively low degree of polymer formation, usually accompanied by an unsuitably low molecular weight of the resulting product.

Now, in accordance with the present invention, it has been found possible to accelerate the polymerization of butadiene in aqueous environment by utilizing as the polymerization system, a rhodium catalyst of the group consisting of hydrated mineral acid salts of rhodium and/or complexes of rhodium (I) with diolefin hydrocarbons, nitric oxide or carbon monoxide; the polymerization system further comprising water and at least one anionic emulsifying agent, the rate and extent of polymerization being increased by the presence of formic acid in an amount between about 0.01 and 10 moles of acid per mole of rhodium catalyst. Still further improvements in the rate of polymerization of butadiene in the presence of the above-described polymerization system are obtained by the additional presence of an alkali metal sulfate and/or hydrogen, all as more particularly described hereinafter.

The polymerization may be conducted at temperatures ranging from about 0° C. to about 150° C., preferably between about 25 and 75° C. The molecular weight of the product can be controlled to a certain degree by regulating the polymerization temperature, the average molecular weight usually increasing at lower temperatures.

Elevated temperatures may be employed, either by increasing the partial pressure of the monomer (butadiene) or by the additional presence of hydrogen as referred to hereinbefore. In the absence of hydrogen, the process is preferably conducted at about autogenic pressure, although superatmospheric pressures up to about 500 p.s.i.g. may be utilized. If hydrogen forms an essential component of the polymerization system, it should be present in an amount sufficient to have a partial pressure of 500–5000 p.s.i.g.

The catalyst used in the process of the invention is critical in that it must be selected from the group stated hereinbefore, of rhodium compounds when used in conjunction with the formic acid accelerator. The catalysts are preferably employed in an amount between about 0.001 and 1 percent by weight based on the original weight of the butadiene being polymerized and preferably in an amount between about 0.01 and 0.5 percent by weight. The rhodium catalysts may be selected from one or more mineral acid salts of rhodium (III) and preferably are the salts having complete water solubility at the concentration and temperature utilized. Normally, the hydrates of such salts are employed since they are found to be more soluble in water. In addition to these mineral acid salts, the diolefin complexes of rhodium plus (I) may be employed as may the complexes with nitric oxide and/or carbon monoxide. Typical species suitable for use in the process of this invention are as follows:

RHODIUM COMPOUNDS AND COMPLEXES

Rhodium trichloride trihydrate
Rhodium trinitrate dihydrate
Rhodium trisulfate tetrahydrate
Bis(dicarbonyl)dichlororhodium
Bis(dinitrosyl)dichlorodirhodium
Dinitrosyl chlororhodium
Bis(dicyclopentadiene)dichlorodirhodium
Bis(cyclooctatriene-1,3,5,7)dichlorodirhodium
Cyclooctadiene-1,5-rhodium cyclopentadienylide The process of the present invention is based upon the discovery that the presence of formic acid substantially increases the rate and extent of polymerization while still maintaining a high degree of stereospecificity of the products so derived. The order of magnitude of improvement in rate is about 5–25 times that of the same catalyst system utilized in the absence of formic acid. The proportion of acid employed should be between 0.01 and 10 moles of formic acid per mole of rhodium, preferably 0.1–1 moles acid per mole of rhodium. The catalyst may be formed in situ or preformed and the formic acid may be added prior, together with or subsequent to catalyst addition to the polymerization system. The catalyst and/or acid may be injected into the polymerization system at one time or at programmed intervals. Since the acid and catalyst (or their possible and potential reaction products) are miscible with or soluble in the polymerization medium, surface effects, such as contamination by polymer coatings, etc., are not encountered.

The system should contain an anionic surface-active agent which is utilized in an amount between about 1% and about 5% by weight based on the aqueous phase. The class of emulsifying agent found to be essential for the successful acceleration of polymerization in the present system comprise the sulfur-containing anionic emulsifying agents, of which the alkyl aryl sulfonates are preferred. Suitable sulfuric acid esters which may be utilized for this purpose include sulfonated oils, sulfonated esters, sulfonated acids, amides, alcohols, sulfated esters, sulfated acids, sulfated amines, sulfated alcohols, sulfated olefins; petroleum sulfonates, $C_{10-18}$ alkyl benzene sulfonates, alkyl naphthalene sulfonates, lignin sulfonates, sulfated polymers, sulfonated polymers, e.g., sulfonated $C_{12-21}$ polymers of lower olefins. Preferred species of this group outlined above include sulfonated tallow, sulfated dodecyl alcohol, sulfated $C_{10-20}$ olefins, green acid sulfonates, dodecyl benzene sulfonate, butyl decyl benzene sulfonate, and amyl naphthalene sulfonates.

The process has been found to be ineffective if cationic or non-ionic surfactants are utilized. The reason for this has not been elucidated. The alkali metal salts, e.g., sodium salts of alkyl aryl sulfonates, are found to be the most preferred type. They may be formed in situ in the aqueous polymerization medium or may be preformed for convenience. It is not known for certain at this time whether or not the emulsifying agent forms a definite complex or compound with the catalyst and/or acid but indications have been noted that such may in fact take place.

The pH of the polymerization system is critical in that little or no polymerization occurs if the pH is too high or too low. The pH may be adjusted to a major extent by the concentration of formic acid, but further adjustments may be made with alkali metal salts of weak carboxylic acid such as sodium acetate or sodium formate. The pH must be between about 1.5 and 4.5, preferably between about 2 and about 4.

In conducting the polymerization in accordance with the present invention, the several components are brought together by any conventional means and in any preferred order. One of the striking aspects of the process is the lack of sensitivity to oxygen contaminants in the reactant and even in the aqueous medium, as distinguished from the highly sensitive catalyst systems normally experienced in this respect. A suggested procedure is to conduct the polymerization in a stirred reaction vessel, which may if necessary be fitted for high-pressure operation, particularly if hydrogen forms an additional component in the polymerization system.

The polymers prepared according to the process of the invention may be utilized for any of the known industrial applications of synthetic rubbers. The products may of course be modified by the presence of the usual rubber-compounding ingredients, such as a vulcanizing agent, pigments, antioxidants, etc.

Still further increases in the rate of reaction are experienced by the additional presence of an alkali metal sulfate such as sodium sulfate, lithium sulfate, or potassium sulfate in an amount between about 2% and 25% based on the weight of the aqueous component of the polymerization system. The manner in which the alkali metal sulfate performs its accelerating function has not been determined. A similar increase in polymerization rate is experienced by the presence of hydrogen in the polymerization system, preferably to the extent of 500–5000 p.s.i.g. This is sharply differentiated from the effect of other gaseous substances such as carbon monoxide or ethylene which have been found to inhibit the polymerization completely. It should be emphasized that the two auxiliary components, i.e., alkali metal sulfate and hydrogen, may be utilized only in the presence of formic acid. Both may be present in addition to the acid, or each may be the sole auxiliary accelerator supplementing the effect of formic acid. The following examples illustrate the acceleration and extent of polymerization using the formic acid in the subject class of polymerization reactions with butadiene.

Example I

A polymerization mixture composed of 10 parts of water, 0.45 part of formic acid, 0.2 part of an $C_{12-20}$ alkyl aryl sodium sulfonate (trade name, Naccanol NRSF), 7 parts butadiene-1,3, and 0.05 parts of rhodium trichloride trihydrate was shaken for sixteen hours at 50° C. It was determined that 95% w. of the butadiene had been converted to a polymer in this reaction period. A parallel experiment was performed, utilizing exactly the same proportions and ingredients (all parts by weight) with the exception that formic acid was omitted. After the same reaction time, only about 8% of the butadiene had been converted to polymer.

Example II

Comparative examples were tested utilizing sodium formate as a buffer, the pH being adjusted over a range from about 2 to about 4.4. The following conditions and results were obtained.

A polymerization mixture composed of 50 parts water by weight, 0.0153 part $RhCl_3 \cdot 3H_2O$, 1.0 part Naccanol NRSF, 20 parts of butadiene-1,3 with varying amounts of formic acid and sodium formate to adjust the pH were shaken for 12 hours at 50° C. The results are summarized in Table I below. The polymers obtained were all greater than 99% trans-1,4-poly-butadiene.

TABLE I

| Experiment No. | HCOOH/ NaHCOO | pH | Yield, Percent |
| --- | --- | --- | --- |
| 1 | 20/1 | 2.18 | 78 |
| 2 | 10/1 | 2.34 | 74 |
| 3 | 4/1 | 2.74 | 52 |
| 4 | 2/1 | 3.05 | 75 |
| 5 | 1/1 | 3.33 | 59 |
| 6 | 1/2 | 3.67 | 35 |
| 7 | 1/4 | 4.01 | 34 |
| 8 | 1/10 | 4.42 | 22 |

Example III

In order to demonstrate the effect of formic acid upon the polymerization rate when utilizing a rhodium complex, the following polymerization mixture was studied: 10 parts by weight of water, 0.2 part by weight of dodecyl benzene sulfonate, 0.45 part formic acid, 0.01 part of bis-(cyclooctadiene-1,5) dichlorodirhodium, and 7 grams of butadiene-1,3 were shaken for sixteen hours at 50° C. A high trans-1,4-polybutadiene was formed, the conversion being about 95% of the original monomer. A parallel experiment omitting formic acid was conducted for a period of about 90 hours, resulting in only 22% conversion of the original monomer to a polymeric high trans product.

Example IV

Comparative experiments were performed to determine the influence of formic acid concentration upon the catalysis of butadiene polymerization utilizing bis(cyclocta-1,5-diene) - $\mu,\mu$ - dichlorodirhodium. The polymerization system comprised 10 parts water, 0.2 part sodium alkyl benzene sulfonate, 0.1 part formic acid, 0.001 part catalyst, 10 parts butadiene, utilizing a polymerization time of 64 hours at 50° C. Table II below presents the results obtained. It will be seen that there is a strong dependence upon formic acid concentration relative to yield of product, but it is not known whether this was due to the pH or to acid concentration for other reasons such as possible complex formation with the catalyst.

TABLE II

| Sample | Formic Acid, millimoles | Yield, Percent |
| --- | --- | --- |
| J | 0.0 | ~7 |
| K | 0.5 | 68 |
| L | 0.125 | 54 |
| M | 0.0125 | 40 |
| N | 0.0025 | 16 |

I claim as my invention:

1. In the emulsion polymerization of butadiene, wherein the polymerization system comprises a polymerization catalyzing amount of a rhodium catalyst of the group consisting of hydrated mineral acid salts of rhodium and complexes of $Rh^+$ (I) with diolefin hydrocarbons, nitric oxide and carbon monoxide, an anionic emulsifying agent and water, the improvement comprising polymerizing butadiene in said system in the presence of formic acid at a pH of 1.5–4.5 and at a temperature of 0–150° C., said acid being present in an amount between about 0.01 and about 10 mols per mol of rhodium catalyst.

2. In the emulsion polymerization of butadiene, wherein the polymerization system comprises 0.001–1% by weight of hydrated mineral acid salts of rhodium based on the original weight of monomeric butadiene, an alkyl aryl sulfonate emulsifying agent and water, the improvement comprising polymerizing butadiene in said system in the presence of 0.1–1 mols formic acid per mol of rhodium at a pH of 2–4 and at a temperature between about 25° C. and about 75° C.

3. In the emulsion polymerization of butadiene, wherein the polymerization system comprises 0.001–1% by weight of a complex of rhodium (I) chloride with a diolefin hydrocarbon based on the original weight of monomeric butadiene, an alkyl aryl sulfonate emulsifying agent and water, the improvement comprising polymerizing butadiene in said system in the presence of 0.1–1 mols formic acid per mol of rhodium at a pH of 2–4 and at a temperature between about 25° C. and about 75° C.

4. In the emulsion polymerization of butadiene, wherein the polymerization system comprises 0.001–1% by weight of the complex bis(cycloocta-1,5-diene) - $\mu,\mu$ - dichlorodirhodium based on the original weight of monomeric butadiene, an alkyl aryl sulfonate emulsifying agent and water, the improvement comprising polymerizing butadiene in said system in the presence of 0.1–1 mols formic acid per mol of rhodium at a pH of 2–4 and at a temperature between about 25° C. and about 75° C.

5. In the emulsion polymerization of butadiene, wherein the polymerization system comprises 0.001–1% by weight of rhodium dinitrosyl chloride based on the original weight of monomeric butadiene, an alkyl aryl sulfonate emulsifying agent and water, the improvement comprising polymerizing butadiene in said system in the presence of 0.1–1 mols formic acid per mol of rhodium at a pH of 2–4 and at a temperature between about 25° C. and about 75° C.

6. In the emulsion polymerization of butadiene, wherein the polymerization system comprises 0.001–1% by weight of rhodium dicarbonyl chloride based on the original weight of monomeric butadiene, an alkyl aryl sulfonate emulsifying agent and water, the improvement comprising polymerizing butadiene in said system in the presence of 0.1–1 mols formic acid per mol of rhodium at a pH of 2–4 and at a temperature between about 25° C. and about 75° C.

References Cited by the Examiner
UNITED STATES PATENTS

| | | | |
|---|---|---|---|
| 2,380,474 | 7/45 | Stewart | 260—94.3 |
| 2,451,180 | 10/48 | Stewart | 260—94.3 |
| 2,546,244 | 3/51 | Tucker | 260—94.3 |
| 3,025,286 | 3/62 | Smith et al. | 260—94.3 |

JOSEPH L. SCHOFER, *Primary Examiner.*